US008860976B2

(12) United States Patent
Kodama

(10) Patent No.: US 8,860,976 B2
(45) Date of Patent: Oct. 14, 2014

(54) IMAGE FORMING APPARATUS HAVING POWER-SAVING UNIT

(71) Applicant: Manabu Kodama, Tokyo (JP)

(72) Inventor: Manabu Kodama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 79 days.

(21) Appl. No.: 13/647,637

(22) Filed: Oct. 9, 2012

(65) Prior Publication Data

US 2013/0088744 A1 Apr. 11, 2013

(30) Foreign Application Priority Data

Oct. 11, 2011 (JP) ................................. 2011-223586

(51) Int. Cl.
*G06K 15/00* (2006.01)
*G03G 15/00* (2006.01)

(52) U.S. Cl.
CPC .................................. *G03G 15/5004* (2013.01)
USPC ............. 358/1.14; 358/1.13; 399/70; 399/88; 702/61; 700/291

(58) Field of Classification Search
CPC ..... G03G 15/5004; G06F 1/3203; G06F 1/26; G06F 1/3284; G06F 1/3287; H04N 1/00896; H04N 1/00885; H04N 1/00891
USPC ............... 358/1.13, 1.14; 399/70, 88; 702/61; 700/291
See application file for complete search history.

(56) References Cited

U.S. PATENT DOCUMENTS

| | | | | |
|---|---|---|---|---|
| 2004/0151513 | A1 | 8/2004 | Nomura | |
| 2005/0094180 | A1 * | 5/2005 | Nishimoto et al. | 358/1.13 |
| 2011/0181116 | A1 | 7/2011 | Takeuchi et al. | |
| 2012/0059606 | A1 * | 3/2012 | Ikari | 702/61 |

FOREIGN PATENT DOCUMENTS

| | | |
|---|---|---|
| JP | 2005-132045 | 5/2005 |
| JP | 2007-295433 | 11/2007 |
| JP | 2010-000652 | 1/2010 |
| JP | 2010000652 A * | 1/2010 |

OTHER PUBLICATIONS

Extended European Search Report Issued Jan. 31, 2013 in Patent Application No. 12187869.8.

* cited by examiner

*Primary Examiner* — Jacky X Zheng
(74) *Attorney, Agent, or Firm* — Oblon, Spivak, McClelland, Maier & Neustadt, L.L.P.

(57) ABSTRACT

An image forming apparatus has at least one measurement unit, disposed on a respective power-supply line extending from a first power source to a respective at least one operation module disposed in the image forming apparatus, configured to measure power consumption at the at least one operation module; and a power-saving unit configured to shut down the power supply from the first power source to the at least one operation module to set the image forming apparatus to a power-save mode, wherein the image forming apparatus is configured to shut down power supply to the at least one measurement unit, when the power-saving unit sets the image forming apparatus to the power-save mode.

9 Claims, 6 Drawing Sheets

IMAGE FORMING APPARATUS HAVING POWER-SAVING UNIT

CROSS-REFERENCE TO RELATED APPLICATION

This application claims priority to Japanese Patent Application No. 2011-223586, filed on Oct. 11, 2011 in the Japan Patent Office, which is incorporated by reference herein in its entirety.

BACKGROUND

1. Technical Field

The present invention relates to image forming apparatuses such as facsimile machines, scanners, printers, copiers, and multi-functional apparatuses including at least two of such functions.

2. Description of the Background Art

Image forming apparatuses may have a power-save mode to reduce power consumption during standby by shutting down power to certain units disposed in the apparatuses.

Some image forming apparatuses have the ability to inform a user of a difference in power consumption between a normal operation mode and the power-save mode. Further, some image forming apparatuses have the ability to measure the power consumption for each operation mode and inform the user of the measured power consumption. Further, some image forming apparatuses have the ability to reduce the amount of power used when measuring power consumption of the image forming apparatus.

For example, JP-2010-000652-A discloses an image forming apparatus having a power measurement unit disposed on a power-supply line from an external power source to functional modules, such as an image forming module and a fusing module. The power measurement unit includes a current detector to detect the current supplied to each module, and a voltage detector to detect the voltage supplied to each module. In the normal operation mode, based on the current and voltage detected by the current detector and the voltage detector, the power consumption at each of the units can be computed. Further, in the power-save mode, the power supply to the voltage detector is shut down, and a projected power consumption at each of the units is computed based on information stored in advance.

However, in conventional image forming apparatus, even in the power-save mode, because the power is being supplied from the power source to the power measurement unit, a given amount of power is still consumed at the power measurement unit wastefully. As a result, power consumption may not be reduced effectively.

SUMMARY

In one aspect of the present invention, an image forming apparatus is devised. The image forming apparatus includes a measurement unit, disposed on a power-supply line extending from a first power source to an operation module disposed in the image forming apparatus, to measure power consumption at the operation module; and a power-saving unit to shut down the power supply from the first power source to the operation module to set the image forming apparatus to a power-save mode. The image forming apparatus shuts down power supply to the measurement unit, when the power-saving unit sets the image forming apparatus to the power-save mode.

In another aspect of the present invention, an image forming apparatus is devised. The image forming apparatus includes a plurality of measurement units each disposed on respective power-supply lines extending from a power source to each of a plurality of operation modules, to measure power consumption at a corresponding one of the plurality of operation modules; and a power-saving unit to shut down the power supply from the power source to each of the operation modules to set the image forming apparatus to a power-save mode. The image forming apparatus shuts down power supply to the at least one measurement unit, when the power-saving unit sets the image forming apparatus to the power-save mode.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
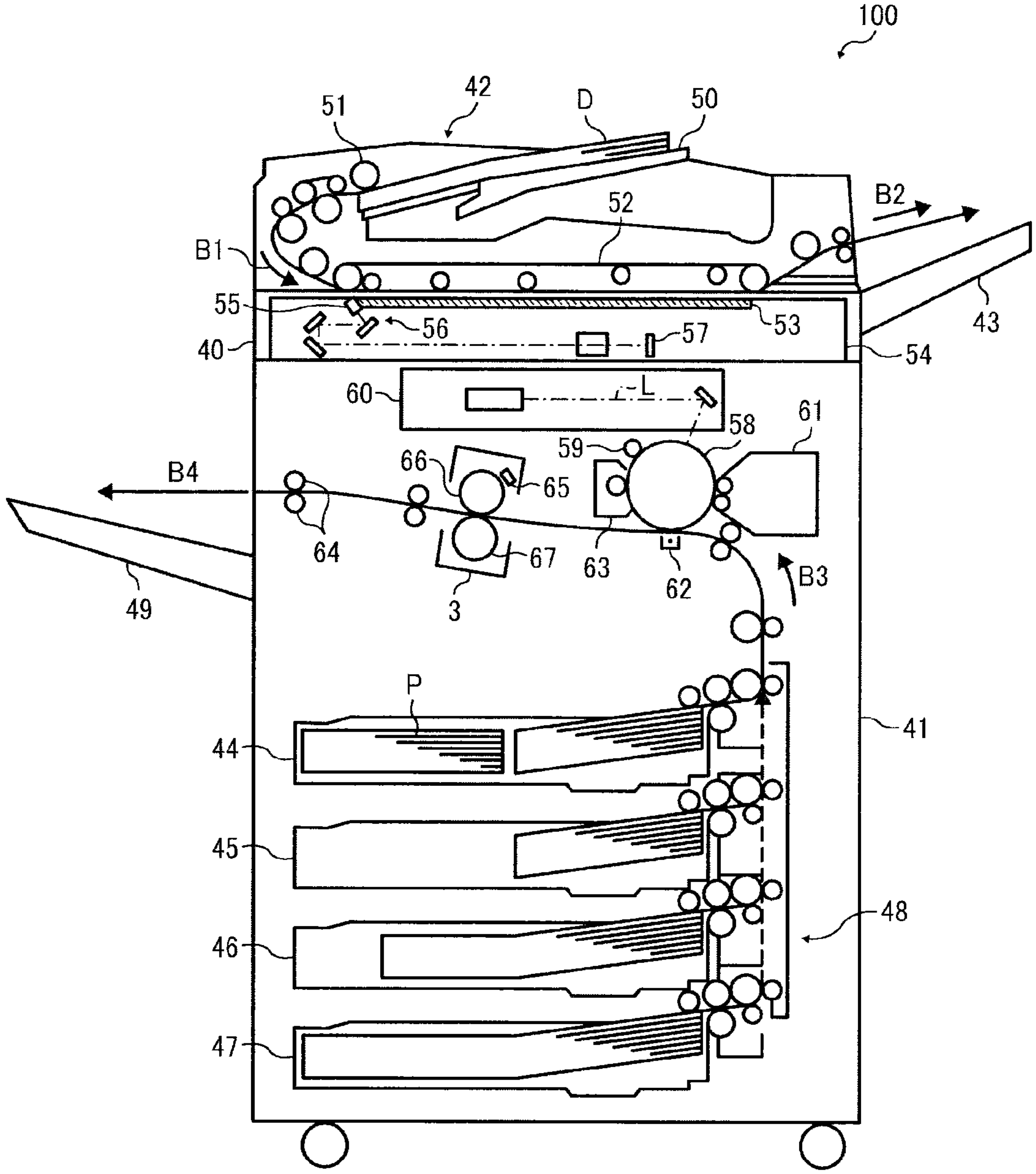
FIG. 1 shows a cross-sectional view of an image forming apparatus according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms “a”, “an” and “the” are intended to include the plural forms as well, unless the context clearly indicates otherwise. Moreover, the terms “includes” and/or “including”, when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, an apparatus or system according to an example embodiment is described hereinafter.

A description is given of an image forming apparatus 100 according to an example embodiment with reference to drawings. FIG. 1 shows a cross-sectional view of the image forming apparatus 100 according to an example embodiment. The image forming apparatus 100 may include a scanning unit 40, an image forming unit 41, an automatic document feeder (ADF) 42, a document ejection tray 43, a sheet feed unit 48, and an ejection tray 49. The scanning unit 40 scans document. The image forming unit 41 forms images. The document ejection tray 43 stacks the document ejected from the ADF 42. The sheet feed unit 48 includes sheet containers 44 to 47. The ejection tray 49 stacks recording sheets.

Upon placing document D on a document base 50 of the ADF 42, a user presses a print button on an operation unit. Then, a top sheet of the document D is moved in a direction shown by an arrow B1 by a rotation of a pickup roller 51, then transported onto a contact glass 53 fixed to the scanning unit 40 by a rotation of a document transport belt 52. The image of the document D, placed on the contact glass 53, is scanned by a scanner 54 disposed between the image forming unit 41 and the contact glass 53.

The scanner 54 includes a light source 55, an optical system 56, and a photo-electric converting element 57. The light source 55 emits light to the document D on the contact glass 53. The optical system 56 focuses the document image. The photo-electric converting element 57 may be a charge coupled device (CCD), to which the document image is focused. After scanning the document, the document D is transported in a direction shown by an arrow B2 by a rotation of the document transport belt 52, and then ejected to the document ejection tray 43. As such, the document D is fed to the contact glass 53 one by one to scan the document image by the scanning unit 40.

Further, a photoconductor 58, which is an image carrier, is disposed in the image forming unit 41. The photoconductor 58 may rotate in a clockwise direction in FIG. 1, and a charger 59 can charge a surface of the photoconductor 58 at a given potential. Further, a writing unit 60 irradiates a laser beam L, modulated based on the image information scanned by the scanner 54, to the charged surface of the photoconductor 58 to expose the surface so that an electrostatic latent image is formed on the surface of the photoconductor 58.

The electrostatic latent image is developed by the development unit 61 as a toner image. Then, a transfer unit 62 transfers the toner image from the photoconductor 58 to the recording medium P, fed to a transfer nip set between the photoconductor 58 and the transfer unit 62. After transferring the toner image, a cleaning unit 63 cleans the surface of the photoconductor 58. The sheet containers 44 to 47, disposed at the lower part of the image forming unit 41, stores the recording medium P such as papers or the like. The recording medium P can be fed in a direction shown by an arrow B3 from any one of the sheet containers 44 to 47. Then, the recording medium P is transferred with the toner image from the photoconductor 58.

Then, the recording medium P is fed to a fusing unit 3 in the image forming unit 41. The fusing unit 3 applies heat and pressure to fuse the toner image on the recording medium P. Then, an ejection roller 34 transports the recording medium P in a direction shown by an arrow B4, and the recording medium P is ejected and stacked on an ejection tray 49. The fusing unit 3 may include a heater 65, a fusing roller 66, and a pressure roller 67. The heater 65 may be, for example, a halogen heater, an electromagnetic induction heating apparatus using the electromagnetic induction for heating, or the like, but not limited these. The fusing roller 66 is a heat generation roller heated by the heater 65. The pressure roller 67 is disposed along the fusing roller 66 by setting the axis of the pressure roller 67 and the axis of the fusing roller 66 in parallel. The fusing roller 66 and the pressure roller 67 forms a nip therebetween, at which the recording medium P is applied with heat and pressure to fuse the toner image on the recording medium P.

Figure 2:
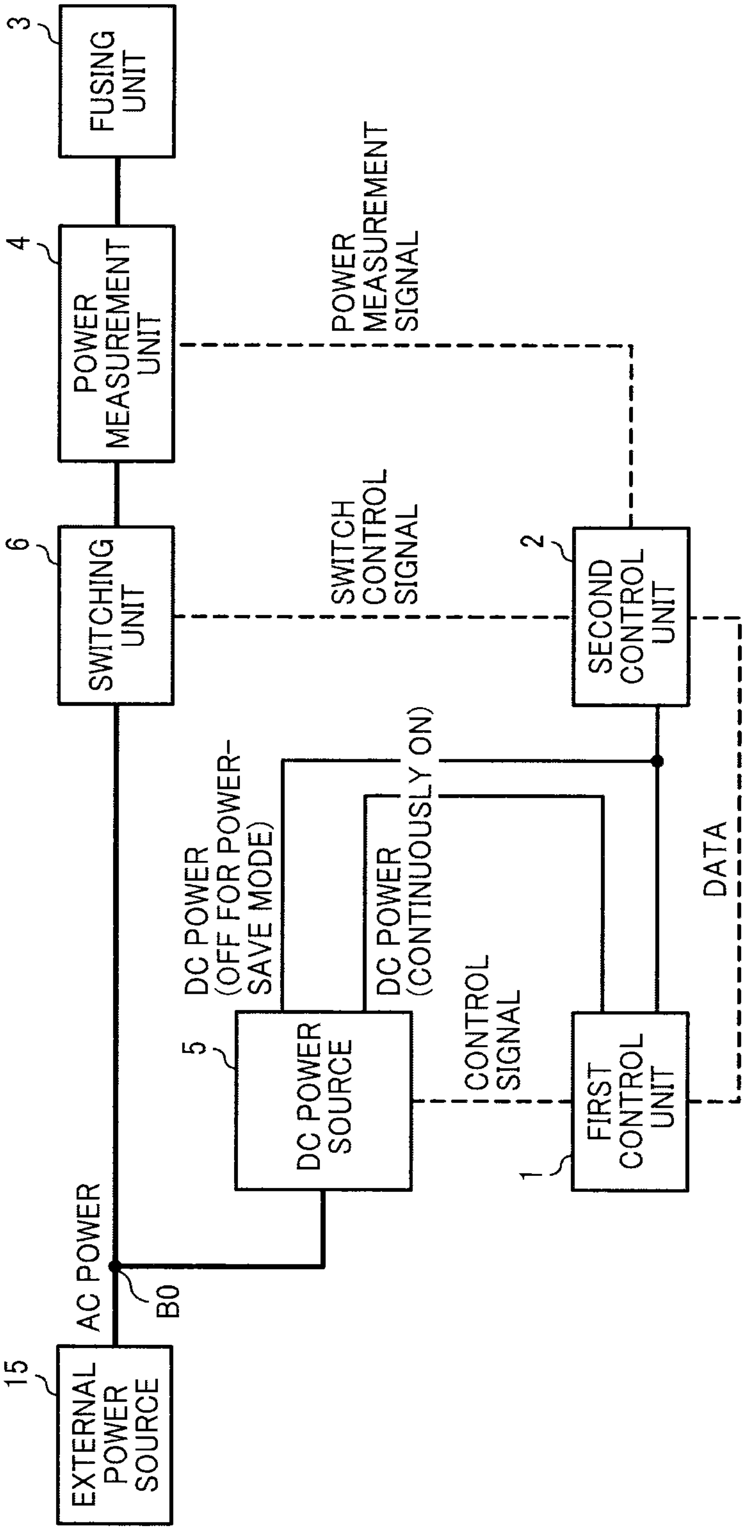
FIG. 2 shows one example configuration of power-receiving devices of the image forming apparatus of FIG. 1.

A description is given of power-receiving devices of a first embodiment disposed in the image forming apparatus 100 with reference to FIG. 2. The power-receiving devices disposed in the image forming apparatus 100 can be also referred to as power-supply destinations because a given power is supplied to each of the power-receiving devices.

In the image forming apparatus 100, as shown in FIG. 2, the power-receiving devices that receive power directly or indirectly from a first power source embodied by an external power source 15 (e.g., commercial power source) may include a first control unit 1, a second control unit 2, a power measurement unit 4, a direct current (DC) power source 5, a switching unit 6, and a fusing unit 3 (see FIG. 1). The external power source 15 corresponds to a first power source that supplies power to the image forming apparatus 100, and the fusing unit 3 and the DC power source 5 are examples of operation modules disposed in the image forming apparatus 100.

In FIG. 2, the fusing unit 3 is explained as one example of a power consumption measurement target. Further, other operation modules operable by alternating current (AC) power can be explained similarly. In FIG. 2, the bold solid line indicates a power supply route or line for AC power from the external power source 15 (e.g., commercial power source), the thin solid line indicates a power supply route or line for DC power, and the dashed line indicates a communication path for data and signals.

Each of the first control unit 1 and the second control unit 2 may be devised, for example, by a micro-computer including a central processing unit (CPU), a read only memory (ROM), and a random access memory (RAM). Each of the first control unit 1 and the second control unit 2 can be operated by the DC power supplied from the DC power source 5.

The first control unit 1 is used to control the image forming apparatus 100 as a whole, and to execute various control operations for a power-save mode. In the power-save mode, the power supply to one or more given operation modules, disposed in the image forming apparatus 100, is shut down to reduce the power consumption of the image forming apparatus 100, by which the operation module can be set at the power-save mode.

The shift to the power-save mode may include the following steps 1 to 3. 1). The shift to the power-save mode is notified to the second control unit 2. 2). Upon receiving a notification from the second control unit 2 that the preparation for the shift to the power-save mode is ready, a control signal is transmitted to the DC power source 5, and a notification to set a power-supply OFF is transmitted to each of given operation modules including the second control unit 2. The given operation modules are a control unit and a process unit to which the DC power supply is stopped in the power-save mode so that the operation of control units and process units is stopped. In FIG. 2, the second control unit 2 is shown as an example of given operation module. 3). The first control unit 1 is also controlled to shift for the power-save mode.

On one hand, the cancelling of the power-save mode may include the following steps 4 to 6. 4). The cancelling of the power-save mode is notified to the second control unit 2. 5) Upon receiving a notification from the second control unit 2 that the preparation for cancelling the power-save mode is ready, a control signal is transmitted to the DC power source 5 to notify that the power-supply ON is to be set for each of the given operation modules such as the second control unit 2. 6). The first control unit 1 is also controlled to cancel the power-save mode.

Further, during the normal operation mode, the first control unit 1 receives various data such as power consumption data transmitted from the second control unit 2, and executes various processing corresponding to each type of the data. Further, in the power-save mode, the first control unit 1 computes the power consumption based on expected values of power consumption stored in a read only memory (ROM) of the first control unit 1, and executes processing corresponding to type of data such as computed power consumption data.

Upon receiving the notification of the shift to the power-save mode from the first control unit 1, the second control unit 2 transmits a switch control signal to the switching unit 6 to control the switching unit 6 at a deactivation condition to shutdown a power supply route or line from the external power source 15 so that the AC power is not supplied to the power measurement unit 4 and the fusing unit 3. When the switching unit 6 is deactivated, the switch is set OFF, by which the power measurement unit 4 and the fusing unit 3 are disconnected from the external power source 15. Hereinafter, the deactivation of the switching unit or switch means that the switching unit or switch is set OFF, by which an electrical connection is disconnected at the switching unit or switch.

Further, upon receiving the notification of cancelling of the power-save mode from the first control unit 1, the second control unit 2 transmits a switch control signal to the switching unit 6 to control an activation condition of the switching unit 6 to activate or resume the power supply from the external power source 15 so that the AC power is supplied to the power measurement unit 4 and the fusing unit 3. When the switching unit 6 is activated, the switch is set ON, by which the power measurement unit 4 and the fusing unit 3 are connected to the external power source 15. Hereinafter, the activation of the switching unit or switch means that the switching unit or switch is set ON, by which an electrical connection is connected at the switching unit or switch.

In FIG. 2, the activation/deactivation control of the switching unit 6 is shown. Further, in addition to the fusing unit 3, an operation module operable by the AC power can be disposed and connected after the switching unit 6. Further, during the normal operation mode, the second control unit 2 receives a power measurement signal from the power measurement unit 4, and transmits the power measurement signal as data indicating the power consumption of the image forming apparatus 100.

The fusing unit 3 receives the AC power supply from the external power source 15 via the power supply route or line, and the fusing unit 3 uses AC power to fuse toner images transferred on the recording medium P. As such, the fusing unit 3 can be used as one of operation modules disposed in the image forming apparatus 100.

The switching unit 6 is disposed on the power supply route or line of the external power source 15. Under the control of the second control unit 2, the deactivation/activation of the switching unit 6 is conducted to shutdown or resume the power supply of AC power from the external power source 15 to the power measurement unit 4 and the fusing unit 3.

The first control unit 1, the second control unit 2, and the switching unit 6 can be collectively used as a power-saving unit to set the power-save mode for the image forming apparatus 100 by shutting down the power supply from the power source to one or more given operation modules.

When the power supply to the image forming apparatus 100 is set ON, the DC power source 5 converts the AC power, supplied from the external power source 15 via the power supply route or line, to the DC power, and continuously supplies the DC power to the first control unit 1 during the normal operation mode and the power-save mode until the power source for the image forming apparatus 100 is set to OFF.

Further, the DC power source 5 supplies the DC power to the second control unit 2 during the normal operation mode, and shuts down the power supply to the second control unit 2 in the power-save mode under the control of the first control unit 1.

Further, in FIG. 2, the second control unit 2 is explained as an example of operation module to which the power supply from the DC power source 5 is shut down in the power-save mode. Further, other operation modules which are required to stop their operations in the power-save mode are also being shut down from the DC power supply.

When the power supply to the image forming apparatus 100 is set ON, and the normal operation mode is set, the power measurement unit 4 can be operated using the power supply from the external power source 15 to measure the power consumption of the fusing unit 3 in the image forming apparatus 100 during the normal operation mode, and transmits the measured power measurement signal to the second control unit 2. As such, the power measurement unit 4 can function as a measurement unit, in particular a power measurement unit.

Further, as shown in FIG. 2, the power measurement unit 4 is at a position disposed after the switching unit 6 on the power-supply line from the external power source 15. Therefore, when the switching unit 6 is deactivated in the power-save mode of the image forming apparatus 100, the power supply from the external power source 15 to the power measurement unit 4 is shut down. As such, when the power-saving unit sets the power-save mode for the image forming apparatus 100, the power supply from the power source (i.e., external power source 15) to the power measurement unit 4 is shut down.

Figure 3:
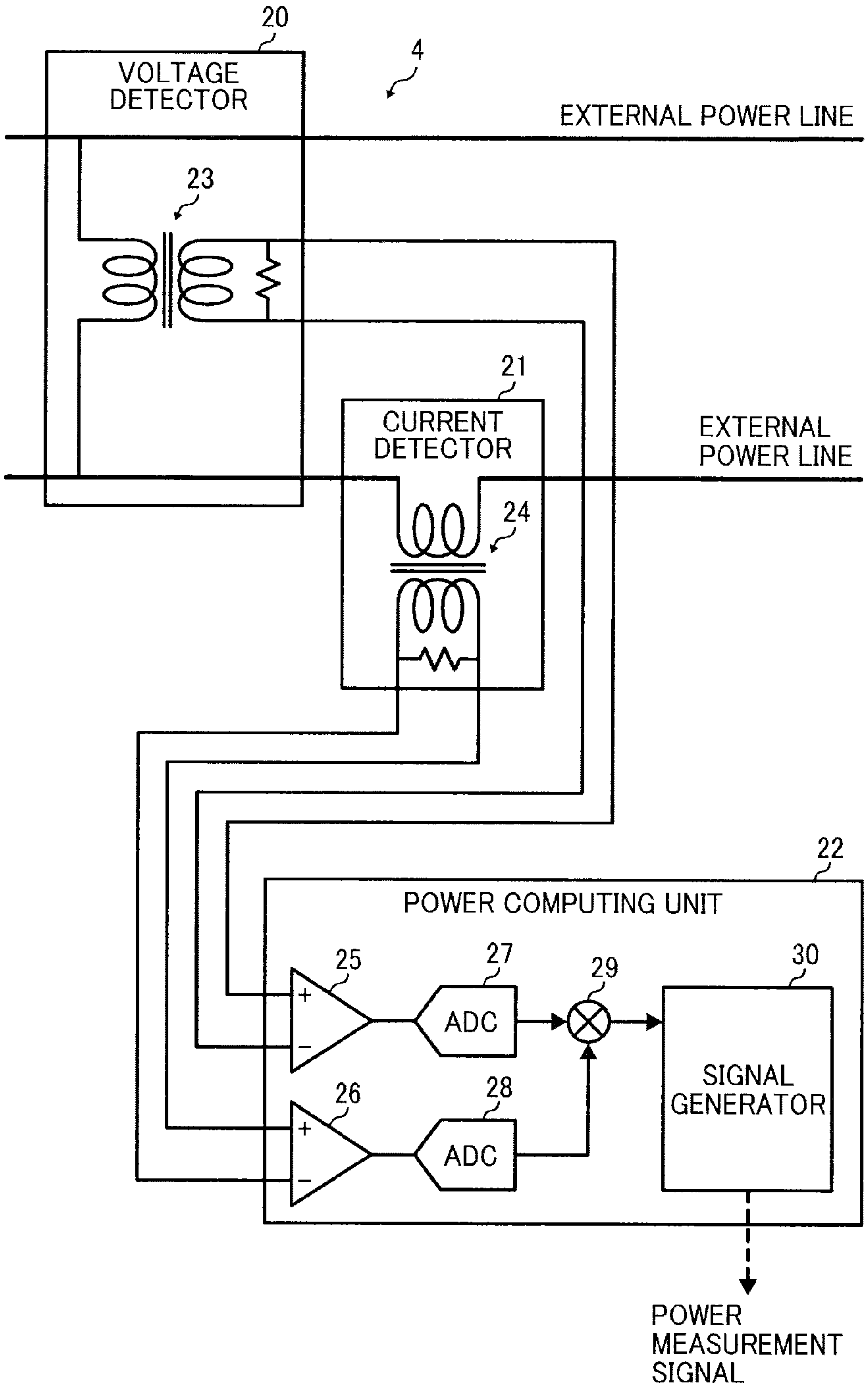
FIG. 3 shows an internal configuration of a power measurement unit shown in FIG. 2.

A description is given of an example of an internal configuration of the power measurement unit 4 with reference to FIG. 3. As for the image forming apparatus 100 (FIG. 1), the power consumption of specific operation modules such as fusing unit 3 can be computed by multiplying voltage and current applied and used by each of the specific operation modules. FIG. 3 shows an example of an internal configuration of the power measurement unit 4 of FIG. 2. The power measurement unit 4 includes, for example, a voltage detector 20, a current detector 21, and a power computing unit 22.

The voltage detector 20 detects voltage of power supplied to the fusing unit 3 from the external power source 15 (FIG. 2) via the power supply route or an external power line. The current detector 21 detects current of power supplied to the fusing unit 3 from the external power source 15 (FIG. 2) via the power supply route or an external power line. The power computing unit 22 computes a power measurement value based on the voltage detected by the voltage detector 20, and the current detected by the current detector 21, wherein such power measurement value corresponds to the power consumption.

Further, as shown in FIG. 3, the power computing unit 22 includes, for example, comparators 25 and 26, analog digital converters (ADC) 27 and 28, a multiplicator 29, and a signal generator 30.

The voltage detector 20 is disposed in parallel to the external power line of the external power source 15 corresponding to the power supply route or line, and outputs the current flowing through a transformer 23 of the voltage detector 20 to the comparator 25 of the power computing unit 22. As such, the voltage detector 20 measures the voltage on the external power line.

The current detector 21 is disposed in series with the external power line of the external power source 15, and outputs the current flowing through a transformer 24 of the current detector 21 to the comparator 26 of the power computing unit 22. As such, the current detector 21 measures the current on the external power line.

In the power computing unit 22, the comparator 25 detects the current flowing through the transformer 23 of the voltage detector 20 as an analog signal of between-terminals voltage, and outputs the detected analog signal voltage to the ADC 27. The ADC 27 converts the analog signal voltage to a digital signal voltage, and outputs the digital signal voltage to the multiplicator 29.

Further, the comparator 26 detects the current flowing through the transformer 24 of the current detector 21 as an analog signal current, and outputs the detected analog signal current to the ADC 28. The ADC 28 converts the analog signal current to a digital signal current, and outputs the digital signal current to the multiplicator 29.

The multiplicator 29 multiplies the voltage received from the ADC 27 and the current received from the ADC 28, and outputs a signal obtained by multiplying the voltage and the current to the signal generator 30. Upon receiving the signal from the multiplicator 29, the signal generator 30 outputs the signal as the power measurement signal to the second control unit 2. As such, the power computing unit 22 can compute the power measurement signal or power measurement value, corresponding to the power consumption, based on the detected voltage and current. Therefore, the second control unit 2 (FIG. 2) can use the power measurement signal received from the signal generator 30 as the power consumption data of the fusing unit 3.

Such power consumption data can be further transmitted to the first control unit 1 of FIG. 2. The first control unit 1 displays the power consumption information on an operation/display unit of the image forming apparatus 100 based on the power consumption data, for example, as a notification to user. Further, the first control unit 1 can notify the power consumption data to a host computer, connected externally via a network, using a communication unit.

The power measurement unit 4 shown in FIG. 3 is disposed in the external power line of the external power source 15 (FIG. 2) directly. In the configuration shown in FIG. 3, because the power is be supplied to the power measurement unit 4 directly from the external power line, the power consumption by the voltage detector 20 and the power consumption by the current detector 21 occurs.

The power consumption at the power measurement unit 4 can be reduced by shutting down the power-supply in the power-save mode, but only the power consumption at the power computing unit 22 can be reduced to zero, and the voltage detector 20 and the current detector 21 consume some power although such consumption may be small.

The voltage detector 20 can be separated from the external power line using, for example, a switch. However, because the current detector 21 is required to be disposed in the external power line in series, the current detector 21 cannot be separated from the external power line, and power is consumed when the current flows through the transformer 24.

Further, instead of the transformer 24, a Rogowskii coil, a Hall sensor, or the like can be used as the current detector 21. However, when the current flows through such a coil and sensor, it creates a magnetic field and power is consumed.

Therefore, as for the image forming apparatus 100, as shown in FIG. 2, the power measurement unit 4 is disposed between the switching unit 6 and the fusing unit 3 in the power supply route or line extending from the external power source 15 to the fusing unit 3. Therefore, in the power-save mode, the power measurement unit 4 is not supplied with power because the power supply is shut down on the power supply route or line extending from the external power source 15 to the fusing unit 3. Therefore, in the power-save mode, the power consumption of the voltage detector 20 and the current detector 21 can be reduced to zero. As such, the power measurement unit 4 is disposed at a position on the external power line (i.e., power supply route) that the power supply to the power measurement unit 4 can be shut down in the power-save mode.

When shifting to the power-save mode, the first control unit 1 (FIG. 2) notifies the shift to the power-save mode to the second control unit 2. Upon receiving such shift notification from the first control unit 1, the second control unit 2 controls the switching unit 6 to the deactivated condition to prepare for shifting to the power-save mode. Then, the second control unit 2 controls the DC power source 5 to partially stop a power-supply to one or more power-receiving devices from the DC power source 5, in which the power-supply to operational modules such as the second control unit 2 is stopped, and the first control unit 1 itself shifts to the power-save mode.

The power consumption in the power-save mode cannot be measured because a measurement unit to measure power is not provided. Instead, projected power consumption is used in the power-save mode.

The power consumption in the power-save mode can be predicted because the configuration of first control unit 1 is basically same although parts capacity of the first control unit 1 such as for example capacity of a random access memory (RAM), capacity of a read only memory (ROM), network function availability, which is continuously supplied with the DC power, may be different. Further, the power consumption of the first control unit 1 supplied with power from the DC power source 5 (FIG. 2) cannot be measured actually in the power-save mode, and the power consumption of the first control unit 1 also uses projected power consumption.

Such projected values of the power consumption in the power-save mode of the image forming apparatus 100 may be stored, for example, in a random access memory (RAM) of the first control unit 1 such as a non-volatile RAM, and a central processing unit (CPU) can compute the power consumption based on such projected values. With such a configuration, power actually consumed to measure the power level in the power-save mode can be substantially reduced to zero. For example, when the power consumption is computed using the projected value, actually consumed power for computing the power consumption can be substantially reduced to zero.

During the normal operation mode, the power measurement unit 4 measures the power consumption of the fusing unit 3. In such a case, the power consumption of the first control unit 1 supplied with power from the DC power source 5 cannot be measured actually, and the power consumption of the second control unit 2 supplied with power from the DC power source 5 cannot be measured actually, and the projected values of the power consumption of the first control unit 1 and second control unit 2 are used. Then, the power consumption of the image forming apparatus 100 can be computed as a sum of the measured power consumption of the fusing unit 3, and the projected values of power consumption of the first control unit 1 and second control unit 2.

The power consumption of the fusing unit 3 disposed in the image forming apparatus 100 may fluctuate greatly due to environment conditions, machine conditions, especially temperature in and/or around the fusing unit 3. Because the power consumption prediction of the fusing unit 3 is difficult, the precision of power consumption measurement of the fusing unit 3 can be enhanced by measuring the power consumption of the fusing unit 3 actually.

Figure 4:
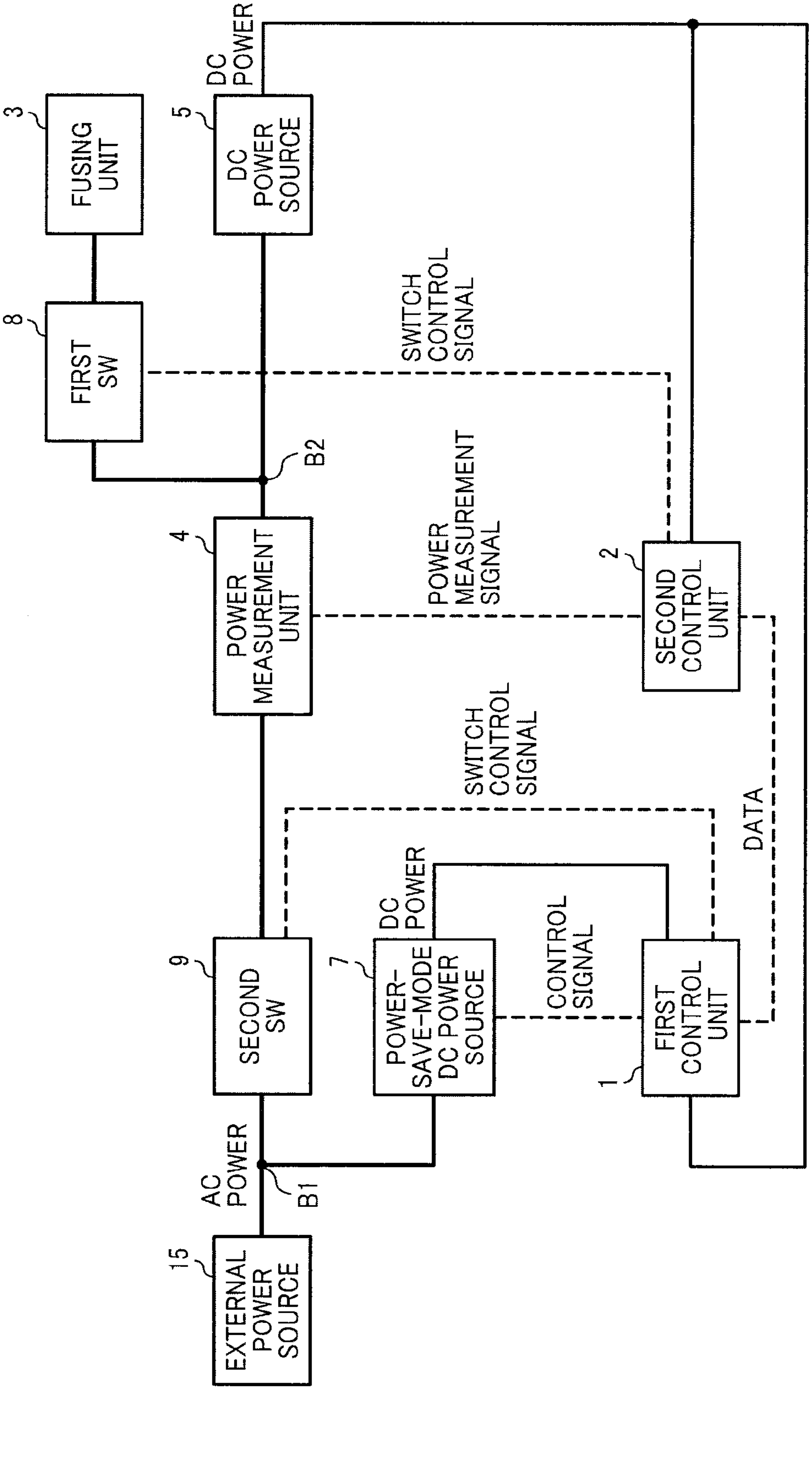
FIG. 4 shows another example configuration of power-receiving devices of the image forming apparatus of FIG. 1.

A description is given another example configuration of power-receiving devices of a second embodiment for the image forming apparatus 100. FIG. 4 shows the configuration of power-receiving devices according to the second embodiment. The parts used also in FIG. 2 are assigned with the same reference characters and numbers. In the configuration of FIG. 4, the power-receiving devices of the external power source 15 includes, for example, a power-save-mode DC power source 7 in addition to the fusing unit 3 and the DC power source 5.

The power-save-mode DC power source 7 is an example of a second power source and is operated or activated only in the power-save mode, and supplies power to the first control unit 1 in the power-save mode. Therefore, based on a power supply from a power source such as the external power source 15, the power-save-mode DC power source 7 can function as a power supplier during power-save mode to supply power to the power-saving unit in the power-save mode.

Further, as shown in FIG. 4, a power supply route or line to the power-save-mode DC power source 7 is branched at a branch point B1 disposed on the power-supply line extending from the external power source 15 to the DC power source 5. Further, a power supply route or line to the fusing unit 3 is branched at a branch point B2 disposed on the power-supply line extending from the external power source 15 to the DC power source 5. On the power-supply line extending from the external power source 15 to the DC power source 5, a second switch (SW) 9 is disposed before the power measurement unit 4, in which the second SW 9 and the power measurement unit 4 are disposed between the branch point B1 and branch point B2 as shown in FIG. 4.

Further, as shown in FIG. 4, a first switch (SW) 8 and the subsequently disposed fusing unit 3 are branched at the branch point B2 from the power supply route or line extending to the DC power source 5. As such, the first switch (SW) 8 is disposed before the fusing unit 3.

Upon supplying the power to the image forming apparatus 100, during the normal operation mode, the power measurement unit 4 is activated and operated by receiving the power-supply from the external power source 15. The power measurement unit 4, disposed on the power-supply line extending to the fusing unit 3 and the DC power source 5 in the image forming apparatus 100, measures the power consumption of the fusing unit 3 and the power consumption of the DC power source 5, and transmits the power measurement signal to the second control unit 2.

Therefore, in the configuration shown in FIG. 4, during the normal operation mode, the power measurement unit 4 measures the power consumption of the fusing unit 3 and the power consumption of the DC power source 5, outputs the power measurement signal, corresponding to the power consumption of the fusing unit 3 and the power consumption of the DC power source 5, to the second control unit 2. As such, the power measurement unit 4 can function as a measurement unit.

The power-save-mode DC power source 7 is not activated or operated during the normal operation mode, but is activated only in the power-save mode. The power-save-mode DC power source 7 can be controlled by a control signal received from the first control unit 1. Specifically, the power-save-mode DC power source 7 supplies power to the first control unit 1 based on the control signal received from the first control unit 1 in the power-save mode.

The first SW 8 can be controlled at the activation/deactivation condition by a switch control signal received from the second control unit 2. Specifically, when the first SW 8 is at the deactivation condition, the AC power supply from the external power source 15 to the fusing unit 3 is shut down, and when the first SW 8 is at the activation condition, the AC power supply from the external power source 15 to the fusing unit 3 is resumed.

Further, the second SW 9 can be controlled at the activation/deactivation condition by a switch control signal received from the first control unit 1. Specifically, when the second SW 9 is at the deactivation condition, the AC power supply from the external power source 15 to the fusing unit 3 and the DC power source 5 is shut down, and when the second SW 9 is at the activation condition, the AC power supply from the external power source 15 to the fusing unit 3 and the DC power source 5 is resumed.

When shifting to the power-save mode, the first control unit 1 notifies such shifting to the power-save mode to the second control unit 2. Upon receiving such shifting notification from the first control unit 1, the second control unit 2 controls the first SW 8 to the deactivated condition, and also stops the operation of the second control unit 2 itself, by which the shifting to the power-save mode can be prepared.

Then, the first control unit 1 transmits a control signal to instruct the power-save-mode DC power source 7 to start the power-supply. Further, after the first control unit 1 controls the power-save-mode DC power source 7 to start the power-supply, the first control unit 1 transmits a switch control signal to the second SW 9 to deactivate the second SW 9.

As such, by setting the first SW 8 at the deactivated condition in the power-save mode, the AC power supply to the fusing unit 3 can be shutdown, and by setting the second SW 9 at the deactivated condition in the power-save mode, the AC power supply to the power measurement unit 4 and the DC power source 5 can be shutdown. Further, when the DC power supply from the DC power source 5 is stopped, the power supply to the first control unit 1 and the second control unit 2 from the DC power source 5 is shutdown. But the first control unit 1 can be supplied with power from the power-save-mode DC power source 7, by which the first control unit 1 can be operated even in the power-save mode.

In the image forming apparatus 100, as shown in FIG. 4, the power measurement unit 4 is disposed at a position between the second SW 9 and the fusing unit 3/DC power source 5. In the power-save mode, the power supply can be shutdown for such position on the external power line, which is the power supply line from the external power source 15 to the fusing unit 3 and the DC power source 5. Therefore, in the power-save mode, the power consumption of the voltage detector 20 and the current detector 21 can be reduced to zero.

Further, in the power-save mode, the power supply to the first control unit 1 can be switched to the power-save-mode DC power source 7 from the DC power source 5. Therefore, even if the power supply from the DC power source 5 to the first control unit 1 is shutdown, the first control unit 1 can be operated using the power supplied from the power-save-mode DC power source 7. The power consumption measurement in the power-save mode can be conducted as similar to the configuration shown in FIG. 2.

Further, the power-save-mode DC power source 7 is a power source used only in the power-save mode, and does not conduct the power-supply during the normal operation mode. Because the power measurement unit 4 measures the power consumption for all units during the normal operation mode, the precision of measurement result be enhanced compared to a case using the projected values. As such, the precision of power consumption measurement during the normal operation mode can be enhanced.

Further, because the power-save-mode DC power source 7 is connected to the external power source 15, such connection may effect to the power consumption during the normal operation mode. Because the power consumption caused by such connection can be predicted or evaluated easily, the power consumption measured by the power measurement unit 4 can be corrected easily using such predicted value.

Figure 5:
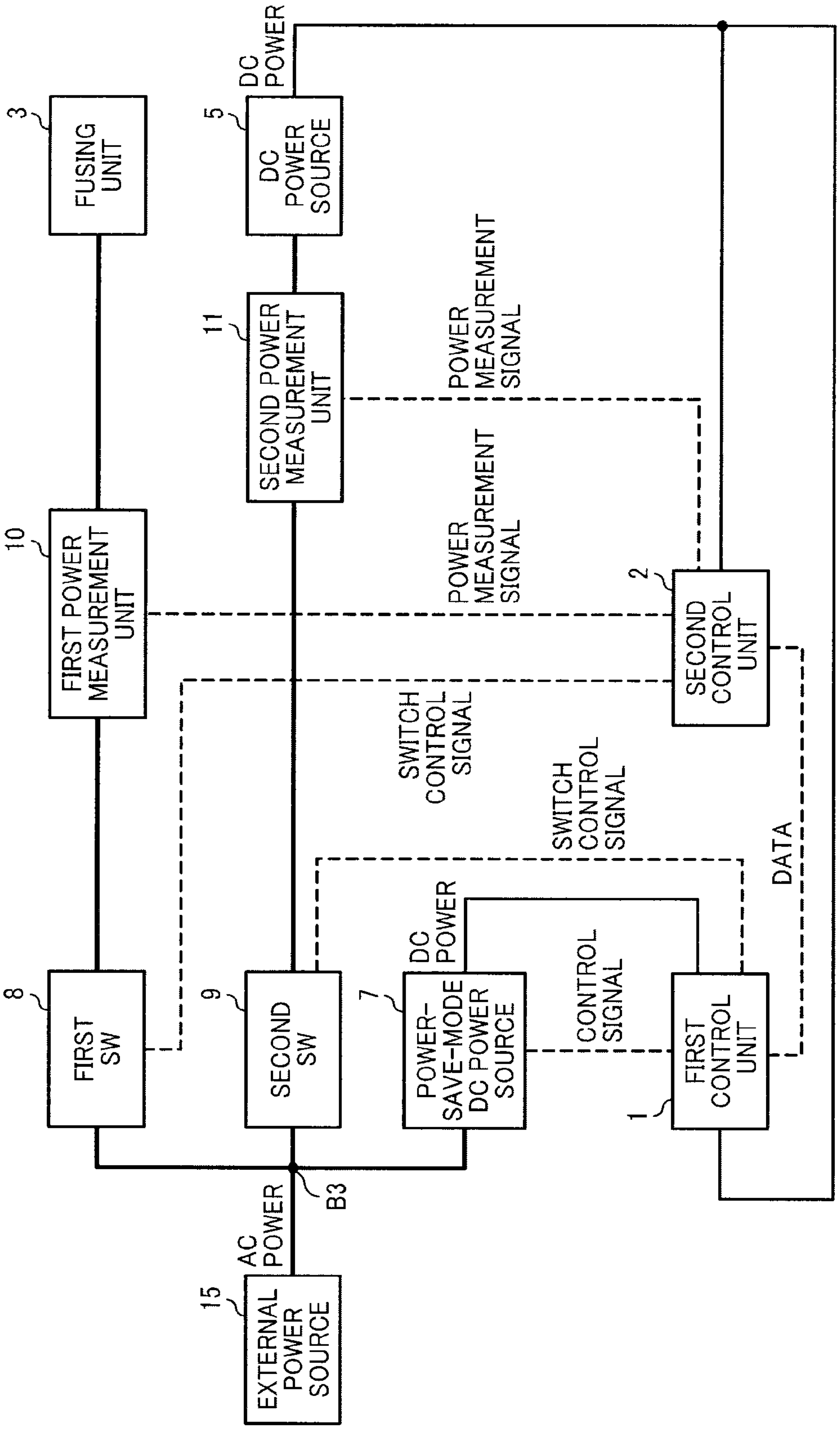
FIG. 5 shows another example configuration of power-receiving devices of the image forming apparatus of FIG. 1.

A description is given of another example configuration of power-receiving devices according to a third embodiment for the image forming apparatus 100. FIG. 5 shows the configuration of power-receiving devices according to the third embodiment. The parts used also in FIGS. 2 and 4 are assigned with the same reference characters and numbers. Different from the configuration of FIG. 4, in the configuration of FIG. 5, the power supply route or line from the external power source 15 to the fusing unit 3 is branched at a branch point B3 set between the external power source 15 and the second SW 9, and the power supply route or line from the external power source 15 to the power-save-mode DC power source 7 is also branched at the branch point B3. Further, a first power measurement unit 10 is disposed between the first SW 8 and the fusing unit 3.

Further, instead of the power measurement unit 4 disposed after the second SW 9 in the configuration of FIG. 4, a second power measurement unit 11 is disposed after the second SW 9 in the configuration of FIG. 5.

The first power measurement unit 10 can be operated by receiving the power supply from the power supply route or line of the external power source 15 during the normal operation mode. The first power measurement unit 10 measures the power measurement value corresponding to the power consumption of the fusing unit 3. The first power measurement unit 10 outputs the power measurement signal indicating the power measurement value of the fusing unit 3 to the second control unit 2.

The second power measurement unit 11 can be operated by receiving the power supply from the power supply route or line of the external power source 15 during the normal operation mode. The second power measurement unit 11 measures the power measurement value corresponding to the power consumption of the DC power source 5. The second power measurement unit 11 outputs the power measurement signal indicating the power measurement value of the DC power source 5 to the second control unit 2.

The first power measurement unit 10 and the second power measurement unit 11 employs a configuration same as the configuration the power measurement unit shown in FIG. 3. In the configuration of FIG. 5, the power measurement unit is disposed on each power-supply line to the fusing unit 3 and the DC power source 5 to measure the power consumption at the fusing unit 3 and the DC power source 5.

As such, in a configuration of having a plurality of operation modules and a plurality of measurement units disposed on a power-supply line for each of the corresponding operation modules, each one of the plurality of measurement units measures the power consumption of the corresponding operation module. Each of the measurement units is disposed at a position on the corresponding power-supply line, and such position is not supplied with power when a power-saving unit sets the power-save mode.

During the normal operation mode, the power measurement signal, corresponding to the power consumption of the fusing unit 3 measured by the first power measurement unit 10, and the power measurement signal, corresponding to the power consumption of the DC power source 5 measured by the second power measurement unit 11 are transmitted to the second control unit 2. The second control unit 2 can compute the power consumption of the fusing unit 3 and the DC power source 5 by adding the power consumption indicated by each of the power measurement signals. The computed power consumption data can be used as similar to the previous cases.

Therefore, the power consumption of the fusing unit 3 and the power consumption of the DC power source 5 can be measured with high precision and the precision of the power consumption measurement at each operation modules can be enhanced.

As such, one power measurement unit is disposed for a fusing unit, and another power measurement unit is disposed for other module or unit to conduct the power consumption measurement suitable for a measurement target during the normal operation mode, by which the power consumption of the image forming apparatus 100 can be determined with an enhanced precision.

When shifting to the power-save mode, the first control unit 1 notifies such shifting to the power-save mode to the second control unit 2. Upon receiving such notification from the first control unit 1, the second control unit 2 controls the first SW 8 to the deactivated condition, and the second control unit 2 stops its operation to prepare for shifting to the power-save mode. Upon completing such preparation, the first control unit 1 transmits a control signal to instruct the power-save-mode DC power source 7 to start the power supply. Further, after instructing the power-save-mode DC power source 7 to start the power supply, the first control unit 1 transmits a switch control signal to the second SW 9 to deactivate the second SW 9.

As such, by setting the first SW 8 at the deactivated condition in the power-save mode, the AC power supply to the fusing unit 3 and the first power measurement unit 10 can be shutdown, and by setting the second SW 9 at the deactivated condition in the power-save mode, the AC power supply to the DC power source 5 and the second power measurement unit 11 can be shutdown.

Further, when the DC power supply from the DC power source 5 is stopped, the power supply to the first control unit 1 and the second control unit 2 from the DC power source 5 is shutdown. But the first control unit 1 can be supplied with power from the power-save-mode DC power source 7, by which the first control unit 1 can be operated even in the power-save mode.

In the configuration shown in FIG. 5, the first power measurement unit 10 is disposed at a position on the power supply route or line extending from the external power source 15 to the fusing unit 3, and the power supply can be shutdown at such position in the power-save mode. The second power measurement unit 11 is disposed at a position on the power supply route or line extending from the external power source 15 to the DC power source 5, and the power supply can be shutdown at such position in the power-save mode. Therefore, in the power-save mode, the power consumption of the voltage detector 20 and the current detector 21 can reduced to zero.

Further, such configuration can be applied to operation modules other than the fusing unit 3 and the DC power source 5. Specifically, each of other operation modules can be provided with a power measurement unit, disposed on the power-supply line, to measure the power consumption at each of the other operation modules as similar to the above example. By measuring the power consumption at each operation module, the precision of power consumption computation of the image forming apparatus 100 can be enhanced. Further, if the power supply to each of the power measurement units can be configured to shut down in the power-save mode, the power consumption at each of the power measurement units can be further reduced.

Further, if the first power measurement unit 10 and the second power measurement unit 11 can be configured to use one common voltage detector, the cost reduction of apparatus or machine can be achieved, and the power consumption by the voltage detector during the power measurement can be further reduced.

Further, the fusing unit 3 includes a heat source such as a halogen heater having heater strings. If the power-factor of heat source can be assumed as 1, the current during the power supply period is proportional to the resistance of heater strings of the heat source and the power consumption can be computed by measuring only the voltage.

Therefore, the internal configuration of the first power measurement unit 10 may be configured with a voltage detector and a power computing unit. The voltage detector detects voltage applied on the power-supply line, and the power computing unit computes current flowing through the fusing unit 3 based on the voltage detected by the voltage detector. Based on the voltage detected by the voltage detector and the computed current, the power consumption of the fusing unit 3 can be computed. The current flowing through the fusing unit 3 can be computed by storing a given algorithm and the resistance value of heater strings of the fusing unit 3 in a memory (e.g., non-volatile RAM) of the power computing unit, and using such algorithm and the resistance value when computing the current.

As such, a current detector can be omitted for the first power measurement unit 10 and the first power measurement unit 10 detects only the voltage, by which the power consumption using the current detector cannot occur for the first power measurement unit and the power amount consumed by the power computing unit during the normal operation mode can be further reduced. Further, because the current detector is not disposed for the first power measurement unit 10, the machine manufacturing cost can be reduced.

Figure 6:
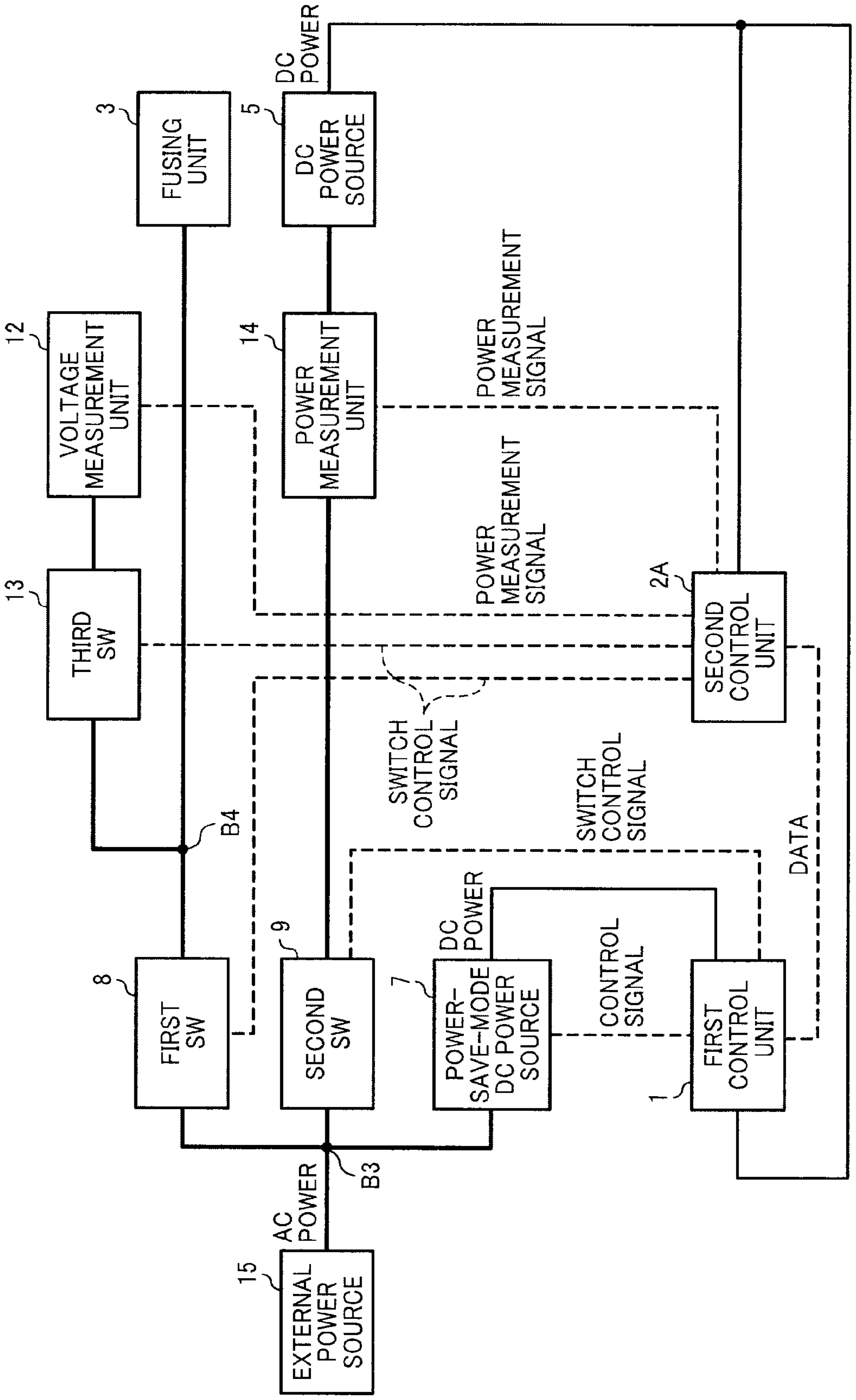
FIG. 6 shows another example configuration of power-receiving devices of the image forming apparatus of FIG. 1.

A description is given of another example configuration of power-receiving devices according to a fourth embodiment for the image forming apparatus 100. FIG. 6 shows the configuration of power-receiving devices according to the fourth embodiment. The parts used also in FIGS. 2, 4, and 5 are assigned with the same reference characters and numbers. Different from the configuration of FIG. 5, in the configuration of FIG. 6, the first power measurement unit 10 in FIG. 5 is omitted, the power supply route or line is branched at a branch point B4 set after the first SW 8, and a third switch (SW) 13 and a voltage measurement unit 12 are disposed on a power supply route or line branched at the branch point B4, in which the third SW 13 is disposed before the voltage measurement unit 12.

Further, instead of the second power measurement unit 11 disposed after the second SW 9 in FIG. 5, a power measurement unit 14 is disposed after the second SW 9 in the configuration as shown in FIG. 6. Further, the second control unit 2A may function slightly differently compared to the above described second control unit 2.

The voltage measurement unit 12 is supplied with the AC power from the power supply route or line extending from the external power source 15 to the fusing unit 3 to measure the voltage of the power source 15.

The third SW 13 is controlled by a switch control signal received from the second control unit 2A to set the activation/deactivation condition for the third SW 13, in which the power supply to the voltage measurement unit 12 is shut down by deactivating the third SW 13, and the power supply to the voltage measurement unit 12 is resumed by activating the third SW 13.

For example, when the heater of the fusing unit 3 is activated for ten (10) seconds, the voltage of the power applied for the first one second, and the voltage of the power applied for each one second in the remaining nine seconds can be assumed as the same value.

Further, the fusing unit 3 includes a heat source such as a halogen heater having heater strings. If the power-factor of heat source can be assumed as 1, the current during the power supply period is proportional to the resistance of heater strings of the heat source and the power consumption can be computed by measuring only the voltage.

Therefore, the power consumption of the fusing unit 3 during the normal operation mode can be measured as follows. The second control unit 2A controls the third SW 13 at the activated condition for only a given time (e.g., one second), and the voltage measurement unit 12 detects the voltage for only such given time. Based on the detected voltage for the given time, the voltage and current to be used for the activation-ON time (e.g., 10 seconds) of the fusing unit 3 can be computed. Then, based on the computed voltage and current, the power consumption of the fusing unit 3 can be computed. Then, the power measurement signal corresponding to the power consumption of the fusing unit 3 can be transmitted to the second control unit 2A.

As such, the second control unit 2A and the third SW 13 can function as a measurement time control unit to control the time for measuring the power consumption by a measurement unit at the given time.

Further, the voltage measurement unit 12 detects the voltage for the given time when supplying power to an operation module, which is a power consumption measurement target. Based on the detected voltage, the voltage and the current used for the operation module, which is the power consumption measurement target, can be computed. Based on the detected voltage and computed current, the voltage measurement unit 12 can compute the power consumption of the operation module.

As for the fusing unit 3, by detecting the voltage of the fusing unit 3 by using the voltage measurement unit 12 as such, when measuring the power consumption, the power used for measuring the current can be reduced, and the power amount consumed by the power computing unit during the normal operation mode can be further reduced.

Further, because only the voltage measurement unit 12 that measures the voltage is disposed for the fusing unit 3, the machine manufacturing cost can be also reduced.

Further, if the voltage of the external power source 15 is assumed as a constant value, the power consumption measurement can be conducted by measuring only current flowing through the power-supply line, and the voltage applied on the power-supply line is not required to be measured, but the voltage value stored in a storage can be used instead.

For example, when measuring the power consumption of the fusing unit 3 of FIG. 6, the voltage of the external power source 15 stored in a memory or storage (e.g., non-volatile RAM) of the second control unit 2A can be used, and the current flowing through the fusing unit 3 can be detected by using a current detector. Then, the power consumption of the fusing unit 3 can be computed based on the voltage and the current. With such a configuration, a power measurement unit is not required to measure the power consumption of the fusing unit 3. Therefore, the voltage measurement unit 12 and the third SW 13 can be omitted from the configuration shown in FIG. 6, by which the machine manufacturing cost can be reduced, and the power consumption required for measuring the power consumption can be reduced.

Further, if the voltage of the external power source 15 is assumed as a constant value, and the power-factor of the DC power source 5 is 1, the internal configuration of the power measurement unit 14 may preferably include a current detector and a power computing unit.

The current detector detects the current flowing through the power-supply line. Based on the current detected by the current detector, and the voltage stored in the storage, the power computing unit computes the power consumption used at the DC power source 5. In such a case, the power measurement unit 14 detects the current flowing through the power-supply line. Based on the detected current, the power measurement unit 14 computes the voltage used at each operation module, which is a power consumption measuring target, and then the power measurement unit 14 can compute the power consumption based on the detected current and the computed voltage.

As such, the voltage detector can be omitted from the power measurement unit 14, and the power measurement unit 14 detects only the current. Therefore, the power consumption used by the voltage detector can be reduced to zero for the power measurement unit 14. Therefore, the power amount consumed by the power computing unit during the normal operation mode can be further reduced. Further, because the voltage detector is not disposed for the power measurement unit 14, the machine manufacturing cost can be also reduced.

In the above described image forming apparatus 100, a measurement unit such as a power consumption measurement unit can be disposed at a position, which is not supplied with power in the power-save mode. Therefore, the power consumption of the power consumption measurement unit in the power-save mode, which may be a waste consumption of energy, can be reduced, by which the power consumption of the image forming apparatus 100 in the power-save mode can be further reduced.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a Wireless Application Protocol (WAP) or 3G-compliant phone) and so on. Since the present invention can be implemented as software, each and every aspect of the present invention thus encompasses computer software implementable on a programmable device.

The computer software can be provided to the programmable device using any storage medium for storing processor readable code such as a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control operation modules used for the apparatus or system. For example, a particular computer (e.g., personal computer, work station) may control an information processing apparatus or an image processing apparatus such as image forming apparatus using a computer-readable program, which can execute the above-described processes or steps. In the above described embodiments, at least one or more of the units of apparatus can be implemented in hardware or as a combination of hardware/software combination. In example embodiment, processing units, computing units, or controllers can be configured with using various types of processors, circuits, processing devices, processing circuits or the like such as a programmed processor, a circuit, an application specific integrated circuit (ASIC), used singly or in combination. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit does include the above-described hardware executing software.

In the above described example embodiments, the image forming apparatus 100 is explained as a copier. However, the present invention can be applied to any machines or apparatuses adaptable for a power-saving function and a power consumption measurement function. For example, the present invention can be applied to image forming apparatuses or image processing apparatuses such as scanners, facsimile machines, printers, and multi-functional apparatuses, but not limited theses.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An image forming apparatus, comprising:

an operation module;

a measurement unit, disposed on a power-supply line extending from a first power source to the operation module, to measure power consumption at the operation module; and a power saving unit including:

a switch to selectively disconnect the power-supply line extending from the first power source to the operation module; and a control unit to control the switch, the control unit receiving power from the first power source at a position between the first power source and the switch, wherein the control unit controls the switch to shut down the power supply from the first power source to the operation module to set the image forming apparatus to a power-save mode, wherein the measurement unit is positioned relative to the switch such that the image forming apparatus shuts down power supply to the measurement unit when the power-saving unit sets the image forming apparatus to the power-save mode.

2. The image forming apparatus of claim 1, wherein the measurement unit detects voltage and current on the power-supply line and to compute a projected power consumption amount based on the detected voltage and current.

3. The image forming apparatus of claim 1, wherein the measurement unit includes a voltage detector and a computing unit, wherein the voltage detector detects voltage on the power-supply line, wherein the computing unit computes, based on the detected voltage, current to an operation module to measure the power consumption at the operation module, wherein the computing unit is computes the power consumption at the operation module based on the detected voltage and the computed current.

4. The image forming apparatus of claim 1, wherein the measurement unit includes a current detector and a computing unit, wherein the current detector detects current flowing through the power-supply line, wherein the computing unit computes, based on the detected current, the voltage at an operation module to measure the power consumption at the operation module, wherein the computing unit computes the power consumption at the operation module based on the detected current and the computed voltage.

5. The image forming apparatus of claim 1, further comprising a measurement time control unit to control a measuring time of the power consumption by the measurement unit for a given time period, wherein the measurement unit includes a voltage detector and a computing unit, wherein the voltage detector detects voltage for the given time period to measure the power consumption at an operation module while power is being supplied to the operation module, wherein the computing unit computes, based on the detected voltage, voltage and current to be used at the operation module corresponding to a measurement target, wherein the computing unit computes the power consumption at the operation module based on the computed voltage and current.

6. The image forming apparatus of claim 1, further comprising a second power source to supply power to the power-saving unit in the power-save mode based on the power supply from the first power source when the image forming apparatus is set to the power-save mode.

7. The image forming apparatus of claim 1, wherein the operation module is a fusing unit.

8. An image forming apparatus, comprising:

a plurality of operation modules;

a plurality of measurement units each disposed on respective power-supply lines extending from a power source to respective ones of the plurality of operation modules, to measure power consumption at a corresponding one of the plurality of operation modules; and a power saving unit including:

a plurality of switches to selectively disconnect the respective power-supply lines extending from the first power source to a corresponding one of the operation modules; and a control unit to control the switches, the control unit receiving power from the first power source at a position between the first power source and the switches, wherein the control unit controls the switches to shut down the power supply from the power source to each of the operation modules to set the image forming apparatus to a power-save mode;

wherein each of the measurement units is positioned relative to the respective switch such that the image forming apparatus shuts down power supply to the respective measurement units when the power-saving unit sets the image forming apparatus to the power-save mode.

9. The image forming apparatus of claim 8, wherein one of the operation modules is a fusing unit.

* * * * *